Sept. 3, 1929.　　　G. P. HENRY　　　1,726,739
BRAKE
Filed April 1, 1925　　5 Sheets-Sheet 1

INVENTOR
GUY P. HENRY
BY
ATTORNEY

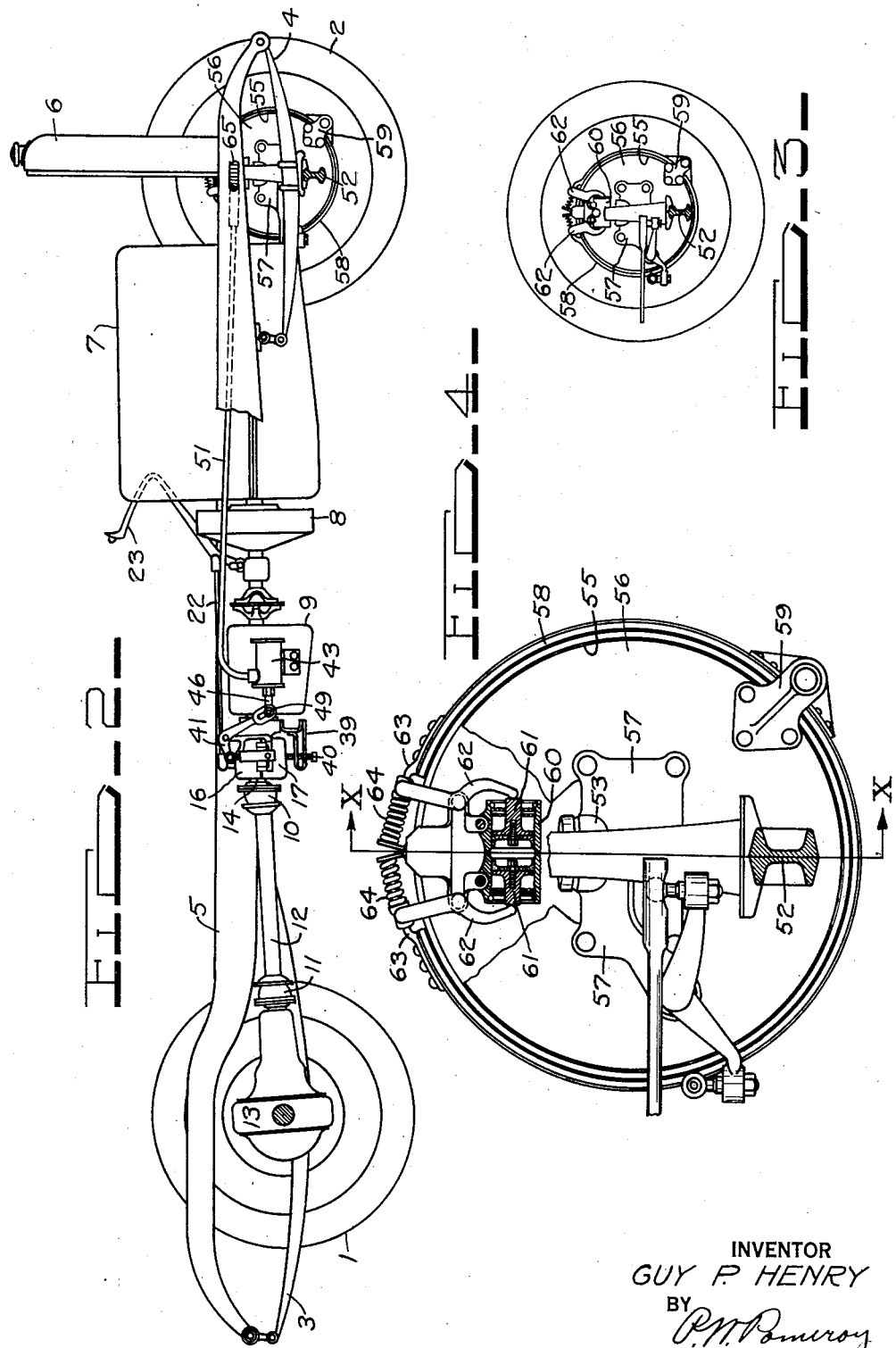

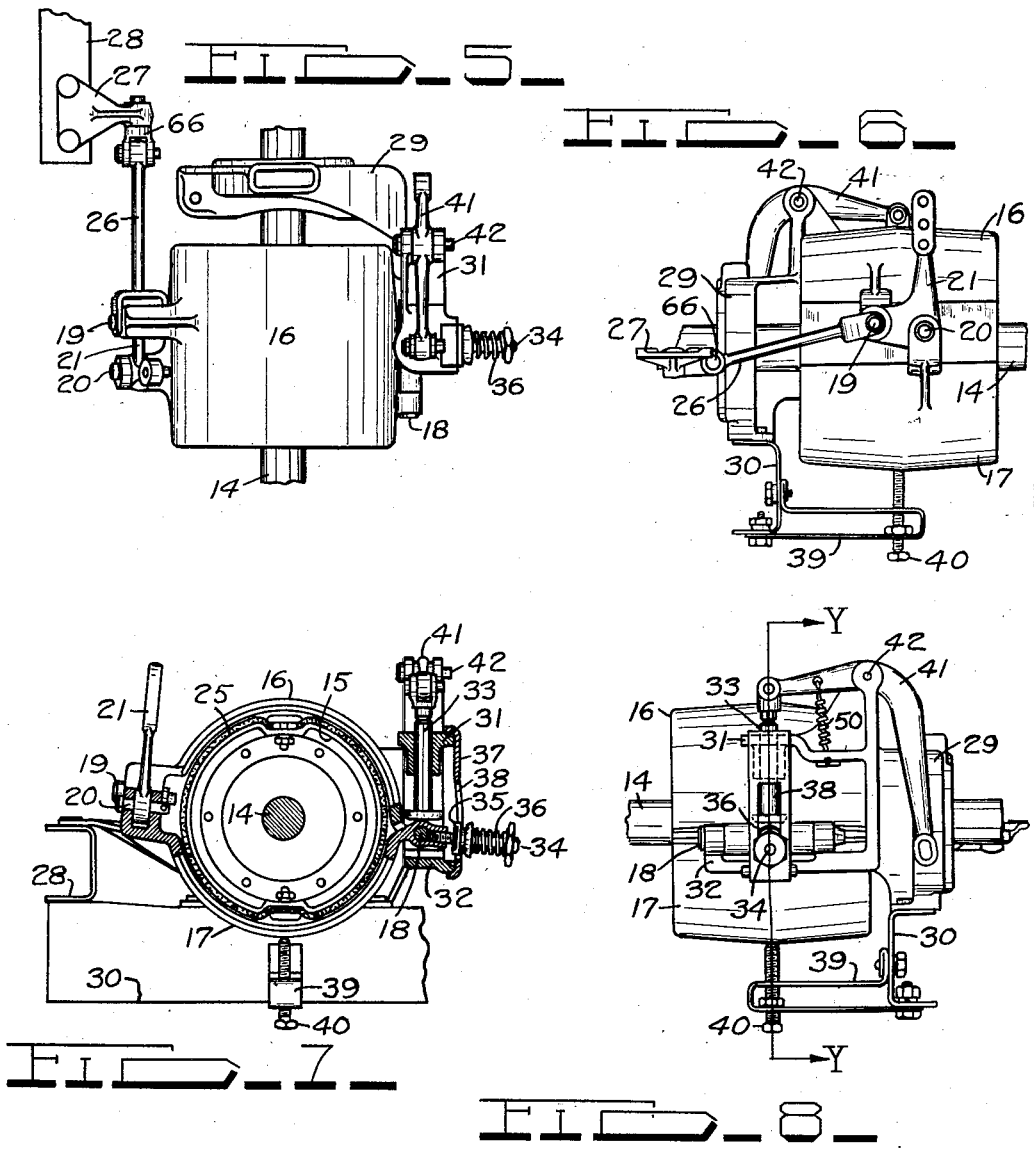

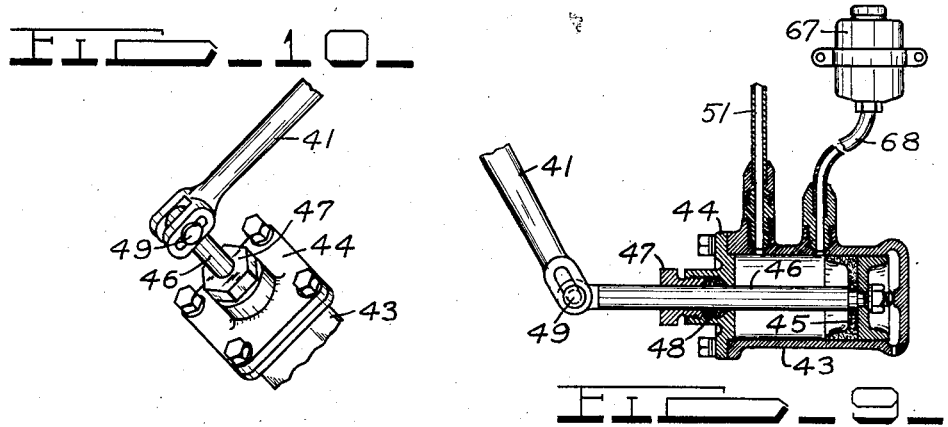
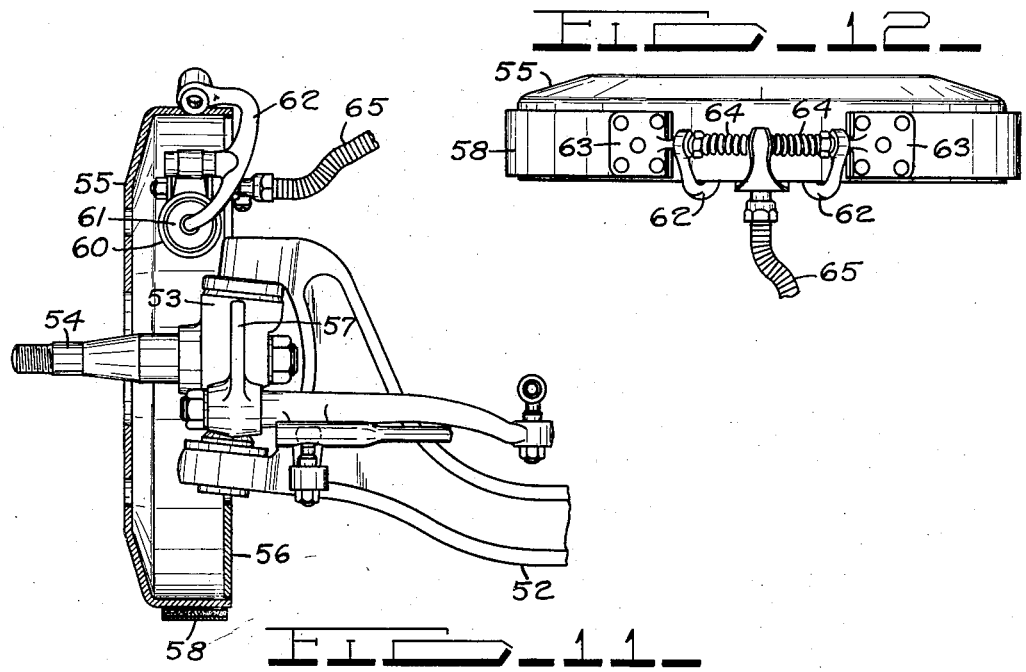

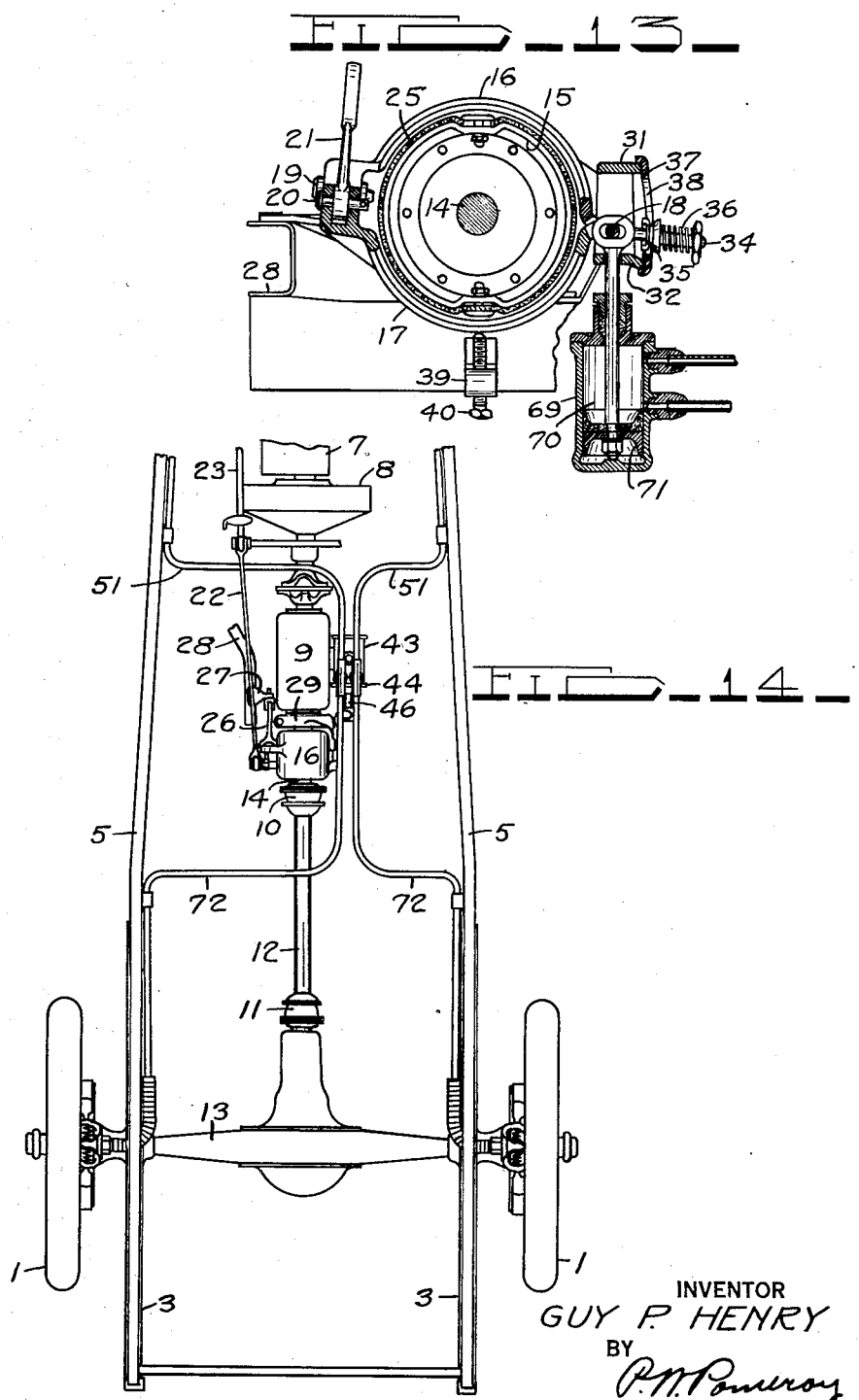

Patented Sept. 3, 1929.

1,726,739

UNITED STATES PATENT OFFICE.

GUY P. HENRY, OF DETROIT, MICHIGAN, ASSIGNOR TO THE STUDEBAKER CORPORATION, OF SOUTH BEND, INDIANA, A CORPORATION OF NEW JERSEY.

BRAKE.

Application filed April 1, 1925. Serial No. 19,989.

This invention relates to brakes for vehicles and more particularly to braking means for all of the wheels.

The principal object of the invention is to provide means whereby, when a braking effect is applied to one wheel or a set of wheels, that braking effect operates to apply brake means for another wheel or set of wheels by utilizing the movement of the vehicle. I am aware that there are braking systems, heretofore devised, wherein the movement of the vehicle is utilized to apply the brakes, but in these systems, the device which is operated by movement of the vehicle and which is used to apply the brakes does not materially, and is not intended to act as a brake for the vehicle. In the present invention the brake part actuated automatically by the movement of the vehicle not only acts as a brake itself for the parts causing its rotation but also acts to apply the brakes on parts independent thereof.

In the accompanying drawings, which show a preferred form of embodiment of my present invention, a brake drum is applied to the rear end of the transmission shaft of an automobile, the transmission shaft being directly connected to both rear wheels through the propeller shaft and axle shafts.
This type of brake is generally known as a transmission brake, but it will be understood that I have employed this type of brake so applied for the purposes of illustration, and that other types of brakes applied to other moving parts of the vehicle may be used if desired. In my preferred form, the brake shoes which frictionally engage the drum on the transmission shaft, are operated under the control of the operator of the vehicle and are so constructed as to be capable of a limited amount of rotation around the drum center. This rotational movement, caused by the braking effect of the shoes on the revolving drum, is utilized by suitable mechanism to operate braking devices on the front wheels. This mechanism is so proportioned that the braking effect of the transmission brake is greater than that of the front wheel brakes, the braking effect of the front wheel brakes being limited to prevent locking of the front wheels against rotation, and comprises, in brief, a main cylinder and piston, the piston of which is connected with the transmission brake shoes in such a manner that rotational movement of the shoes causes a longitudinal movement of the piston, such longitudinal movement being utilized to force a liquid contained in the main cylinder through pipe lines to auxiliary cylinders positioned at the front wheel brakes, which auxiliary cylinders are each provided with a piston connected with the front wheel brakes and are operated to apply such brakes when the liquid from the main cylinder is forced into the auxiliary cylinders.

With the above and incidental objects in view, the invention consists in certain novel features of construction and combinations of parts, the essential elements whereof are recited in the appended claims and a preferred form of embodiment of which is described in detail hereinafter and illustrated in full in the accompanying drawings which form a part of this specification.

In the drawings,

Figure 2 is a right-hand side elevation of the motor vehicle shown in Figure 1, with parts of the chassis broken away.

Figure 3 is an inner side view of the left front wheel with the brake mechanism applied thereto.

Figure 4 is an inner side detail view of the brake mechanism on the wheel shown in Figure 3, the front axle and piston cylinder being shown in section.

Figure 5 is a plan view of the transmission brake.

Figure 6 is a left-hand elevation of the transmission brake.

Figure 7 is a rear view of the transmission brake showing the operating connections associated therewith in section, as on the line Y—Y of Figure 8.

Figure 8 is a right-hand side elevation of the transmission brake.

Figure 9 is a longitudinal, vertical, sectional view through the main cylinder and piston.

Figure 10 is a fragmentary perspective view showing the manner of connecting the piston rod of the main piston to the arm actuated by rotational movement of the transmission brake shoes.

Figure 11 is a vertical, sectional view of the front wheel brake mechanism taken on the line X—X of Figure 4.

Figure 12 is a plan view of the front wheel brake drum and brake mechanism.

Figure 13 is a view corresponding to Figure 7 but showing a modification of the means for effecting a longitudinal movement of the main piston by the rotary movement of the transmission brake shoes.

Figure 14 is a plan view of the rear portion of the motor vehicle, with the body removed, corresponding in part to the view in Figure 1, showing a modification of the embodiment of the preceding views, and in which the movement of the piston in the main cylinder is further utilized to operate additional brakes on the rear wheels.

Figure 1:
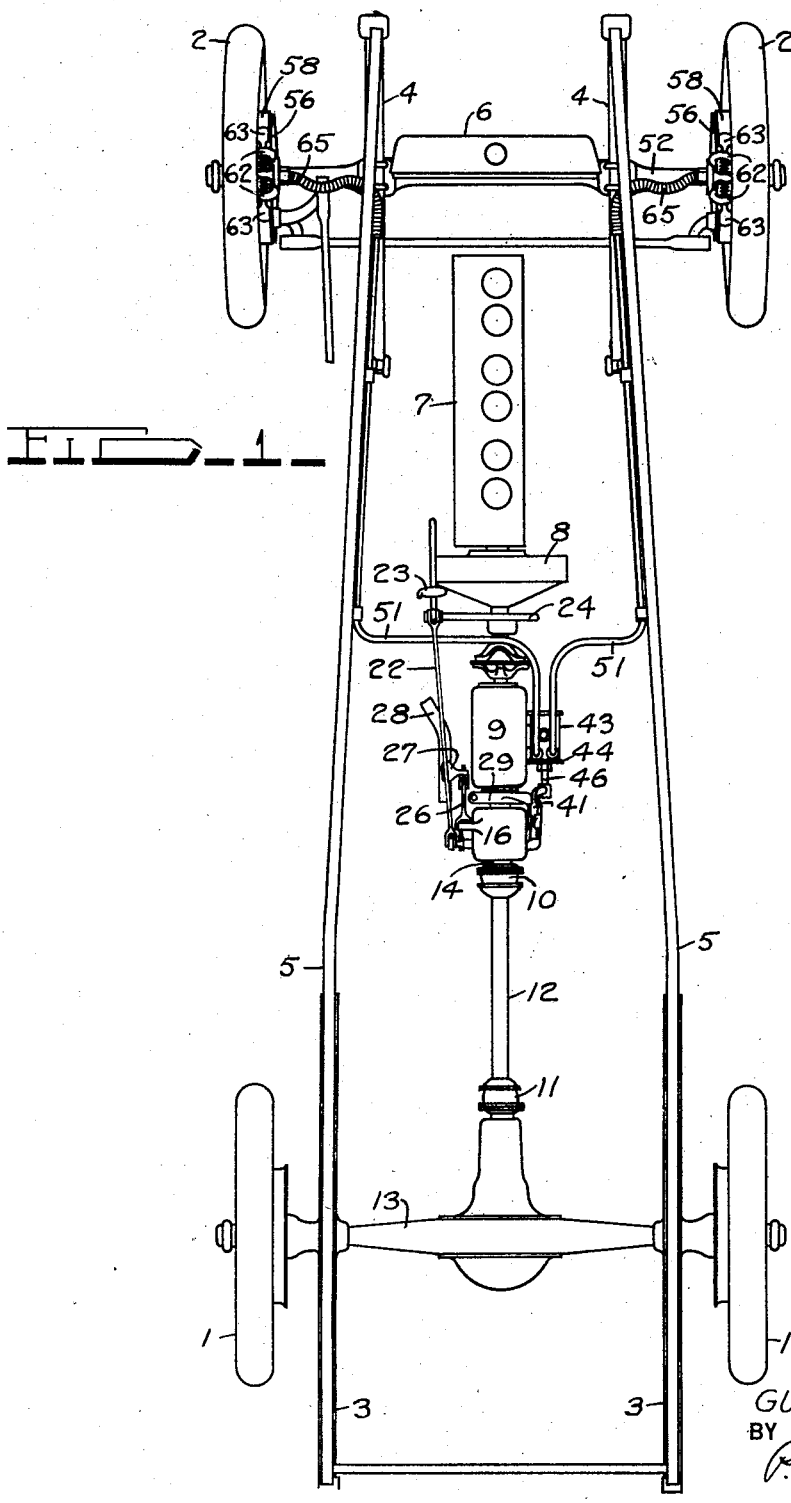
Figure 1 is a plan view of a motor vehicle, with the body removed, showing the preferred form of embodiment of my present invention incorporated therein.

The drawings show, more or less diagrammatically, a vehicle including rear wheels 1, front wheels 2, rear springs 3, front springs 4, frame 5, radiator 6, engine 7, clutch 8, transmission 9, universal joints 10 and 11, propeller shaft 12, and rear axle 13, with other features incorporated therein as will hereinafter be described. As is usual in such vehicles, the rotational movement of the engine 7 is transmitted through the clutch 8, transmission 9, universal joints 10 and 11, propeller shaft 12, the axle shafts of the rear axle 13, to the driving wheels 1. At the rear end of the transmission shaft 14 is secured the brake drum 15 of the transmission brake so that any retardation of the drum 15 causes a relative retardation of the rotation of the rear wheels 1 and therefore of the vehicle. In order to apply a retarding effect on the rotation of the drum 15, two brake shoes 16 and 17 are suitably mounted to frictionally engage the same when operated under the control of the operator of the vehicle. These two brake shoes 16 and 17 at their right hand ends (Figures 7 and 8) are provided with laterally projecting eyes connected together by a pin 18 to form a hinge joint. The opposite ends of the brake shoes 16 and 17 are provided with integral projections or brackets and are pivoted by pins 19 and 20, respectively, to a bell crank lever 21 (Figures 5, 6 and 7). The upper end of the vertical arm of the bell crank lever 21 is pivotally connected to the rear end of a rod 22 which at its forward end is secured to the lower end of a manually operated lever 23, which is preferably in the form of a foot pedal pivotally mounted on a member 24 suitably supported by the frame 5.

Forward movement of the foot pedal 23 causes the shoes 16 and 17 to be drawn together by the camming action of the bell crank 21, thus causing the brake shoes to frictionally engage the brake drum 15 which is provided with a suitable friction facing material 25. A radius rod 26 (Figures 5 and 6) fastened at its rear yoked end by the pin 19 to the bracket on the shoe 16 serves to hold the brake shoes 16 and 17 with their accompanying mechanism in correct longitudinal position, the forward end of the radius rod 26 being secured to a bracket 27 on a suitable sub-frame 28, a portion only of which is shown. A bracket 29, suitably fastened to and positioned on a frame cross member 30 serves to partially support the brake shoes 16 and 17 and their accompanying mechanism. The bracket 29 is formed with integral and rearwardly projecting horizontal yoke arms 31 and 32 between which the projecting right-hand ends of the brake shoes 16 and 17, connected by the pin 18, are positioned. The upper arm of the yoke is provided with a vertical bearing or boss receiving a plunger 33 (Figure 7) and the head of the plunger on its lower end rests on the right-hand projecting end or eye of the brake shoe 17. For the purpose of normally maintaining the normal horizontal radial alignment of the brake shoes 16 and 17 with respect to the sides of the drum 15, a spring device is employed as best shown in Figures 7 and 8. This device comprises a rod 34 threaded at its inner end into the right hand projecting end of the brake shoe 17, a member 35 threaded on the rod 34, an encircling spring 36, and a vertical plate 37 secured to the arms 31 and 32 and provided with a curved portion, which is concentric with the drum 15 and slotted at 38. The member 35 projects through the slot 38 and the spring 36 maintains part of the member 35 in firm frictional engagement with the plate 37 to preserve the proper transverse relationship between the brake shoes and brake drum. Another bracket 39, which projects rearwardly under the brake shoe 17 and is fastened to the cross member 30, is provided with a vertically adjustable screw 40 upon the upper end of which normally rests the brake shoe 17 to support the brake shoes 16 and 17 in proper vertical relation from the upper and lower parts of the drum 15, while the brake is not being applied.

The upper end of the plunger 33 is suitably connected to the horizontal arm of a bell-crank lever 41 which is pivoted on the pin 42 carried by the bracket 29, the connection at the upper end of the plunger and arm of the bell crank lever 41 being such as to permit the plunger to be moved in a vertical line while the end of the arm of the bell crank describes a slight arc when the lever is rocked, thus compensating for the pivotal movement of the lever.

Secured to the right hand side of the transmission 9 is a cylinder 43 the axis of which lies parallel to the length of the vehicle. The front end of the cylinder 43 is permanently closed and the rear end is closed by a removable cover or head 44. Within the cylinder 43 is a piston 45 (Figure 9) adapted to reciprocate therein and it is provided with a piston rod 46 which extends rearwardly therefrom through the cover 44 which is provided with a suitable gland 47 and packing 48 to prevent leakage thereby, and is slidably connected by a pin 49 to the slotted lower bifurcated end of the vertically disposed arm of the bell crank 41. The lower end of the bell crank 41 is slotted so that the arcuate movement of the same may be compensated for in relation to the straight line movement of the piston rod 46 when these two parts move together. The piston 45 normally lies at the forward end of the cylinder 43 when the brake is not being applied, it being urged to such position by a coil spring 50 (Figure 8) which tends to draw the horizontal arm of the bell crank lever 41 downward, and which consequently tends to move the lower end of the vertical arm of the same forward, as well as holding the right hand projecting ends of the brake shoes 16 and 17 down against the lower yoke arm 32 of the bracket 29. Communicating with the interior of the cylinder 43 adjacent the rear end thereof are two pipes or tubes 51 which extend therefrom to a point on the frame 5 opposite the front wheels 2.

The front axle 52 (Figures 4 and 11) which is secured to the springs 4 in a conventional manner, pivotally carries a steering knuckle 53 at each end thereof, each steering knuckle being provided with a spindle 54 which rotatably carries the front wheels 2. Each front wheel is provided with a brake drum 55 secured thereto in a conventional manner, and a plate 56, secured to flanges 57 on the steering knuckle 53 acts to close the open end of the drum 55 and also to support the brake mechanism thereon. A brake band 58, placed in a conventional relation to the exterior of the drum 55 is supported between its split ends by a bracket 59 carried by the plate 56. Secured to the plate 56 adjacent the upper edge thereof is a casting embodying a cylinder 60 in which are positioned two oppositely disposed normally adjacent pistons 61. Pivotally mounted on the casting at a point above the cylinder 60 are two arms or levers 62, the lower end of each of which bears against one of the pistons 61, and the upper ends of which are suitably connected to the brackets 63 secured to the split or free ends of the band 58, thereby supporting the band 58 at this point. It will be apparent that if the pistons 61 are forced apart, the upper ends of the levers 62 will draw the ends of the band 58 toward each other, thereby contracting the band 58 and causing it to frictionally engage the drum 55. Suitable springs such as 64 are interposed between the ends of the band 58 and a projection of the casting to normally force the ends apart and to hold the band free of the drum 55. The interior of each cylinder 60, between the pistons 61 is connected with a flexible tube 65, which allows for the swinging of the wheels 2, to the tube 51 on its respective side of the vehicle, thereby communicating the interior of the cylinders 60 with the interior of the cylinder 43. The interior of the cylinder 43, the tubes 51 and 65, and the cylinders 60 are filled with a suitable fluid or liquid, a preferable liquid being a mixture of alcohol and glycerine. It will be evident that when the piston 45 is caused to move rearwardly, the liquid displaced thereby in the cylinder 43 will be forced through the tubes 51 and 65 into the cylinders 60, forcing the pistons 61 apart and causing the bands 58 to engage the drums 55, thereby effecting a braking effect on the front wheels 2.

In order to insure the cylinders 43 and 60, together with their connecting tubes 51 and 65 being at all times fully filled with the liquid previously described, a reserve tank 67 (Figure 9) of such liquid, open at its top to the atmosphere, is connected by the tube 68 to the interior of the cylinder 43 at a point immediately adjacent the rear edge of the piston 45 when the latter is in full forward or non-braking position. This construction is preferably employed so that if any of the liquid leaks out during the application of the brakes, sufficient liquid from the tank 67 will flow by gravity into the cylinder 43, when the piston 45 has moved to full forward position to uncover the opening from the tank into the cylinder, to replace such leakage. On rearward or brake applying position of the mechanism, the piston 45 will have moved an amount sufficient to close the opening into the tank 67 and the liquid in the cylinder 43 will be displaced through the tubes 51, as previously described, and cause application of the front wheel brakes.

From the above description, it is thought that the operation of the mechanism comprising my present invention will be obvious. When the foot pedal 23 is depressed, the rod 22 is pulled forwardly, which results in rocking the lever 21 counterclockwise, as viewed in Figure 6, and as the lever is pivoted to the brackets on the adjacent ends of the brake shoes 16 and 17 it serves to move these ends towards each other, due to its camming action, with the result that the brake shoes are brought into frictional engagement with the suitable frictional material 25 on the outer periphery of the drum 15. During forward movement of the vehicle, the drum 15 is rotated in an anti-clockwise direction, as viewed in Figure 7, and the resistance to the braking effect of the shoes 16 and 17 on the drum 15 has a tendency to rotate the shoes 16 and 17 in the same direction with the drum. This tendency to rotate is opposed partly by the spring 50, associated with the bell crank 41 and acting on the shoes 16 and 17 through the plunger 33, but mostly by the resistance offered in contracting the brake bands 58 about the front wheel brake drums 55. As the foot pedal 23 is depressed further, causing the brake shoes 16 and 17 to increase their frictional engagement with the drum 15, the tendency of the shoes to rotate with the drum becomes greater and finally overcomes the resisting action of the spring 50 and the front wheel brakes, and the shoes 16 and 17 are given a rotational movement the extent of which depends upon the braking effect applied to the drum 15. When the brake shoes 16 and 17 rotate with the drum 15, the plunger 33 is elevated, rocking the bell-crank 41 clockwise, as viewed in Figures 2, 8 and 9, the lower end of the bell-crank 41 being moved rearwardly and drawing with it the piston rod 46 and piston 45. As previously described, the rearward movement of the piston 45 causes the liquid in the cylinder 43 to be displaced through the tubes 51 and 65 into the cylinders 60, forcing the pistons 61 apart and contracting the bands 58 about the drums 55, thereby effecting a braking action on the front wheels 2. It will be evident from the above that the resistance set up by the application of the shoes 16 and 17 to the drum 15 is balanced by the resistance set up by the application of the bands 58 to the drums 55, and that when the pressure applied to the foot pedal 23 is increased or decreased to cause a corresponding increase or decrease of the frictional effect of the brake shoes 16 and 17 on the drum 15, the shoes 16 and 17 will rotate in a clockwise or anti-clockwise direction an amount sufficient to cause a corresponding change in the frictional effect of the brake bands 58 on the drums 55, or in other words, the shoes 16 and 17 will rotate in accordance with the amount of pressure applied to the pedal 23 to cause a resistance to applying the front wheel brakes equal to the resistance offered to applying the transmission brake. Inasmuch as the transmission brake acts on the rear wheels it will be seen that the resistance offered to applying the rear wheel brakes is at all times balanced by the resistance offered to applying the front wheel brakes.

The lengths of the arms of the bell-crank 41, and the relative sizes of the cylinders 43 and 60 are so proportioned that although the resistance offered to applying the transmission brake is balanced by the resistance offered to applying the front wheel brakes, the actual braking effect on the front wheels is materially less than the actual braking effect on the rear wheels, so that the moment enough pressure is applied to the pedal 23 to lock or slide the rear wheels, no further rotation of the brake shoes 16 and 17 occurs due to the fact that the drum 15 has stopped rotating, and consequently no greater braking effect can be applied to the front wheels than that acting at the moment the drum 15 is so locked, making it impossible to lock the front wheels under any circumstances. In the ordinary type of front wheel brakes it is usually possible to adjust or design them so that the rear wheels will lock before the front wheels, but in all of these types, so far as I am aware, further depression of the brake pedal will also lock the front wheels, which is very undesirable as in many cases it causes loss of control of the vehicle. In the present construction, after the drum 15 has been locked by applying sufficient pressure on the pedal 23, no further braking effect can be applied to the front wheels by further depressing the pedal 23 due to the fact that the drum 15 has stopped rotating.

It will therefore be seen from the above, that the amount of braking action applied to the front wheels is dependent upon and proportional to the amount of braking effect applied to the drum 15. Only sufficient pedal pressure is required to operate the transmission brake (which is a relatively small pressure) in order to also cause application of braking action to the front wheels, thus relieving the operator of considerable physical effort, as the automatic turning of the transmission brake shoes, effected by the movement of the vehicle itself, is utilized to apply the front wheel brakes without requiring any further pressure on the foot pedal than is necessary to operate the transmission brake.

As the brake shoes 16 and 17 rotate with the drum 15 during operation of the transmission brake, the rod 22 extending from the bell crank 21 to the pedal 23, is subjected to a twisting effect or torsional strain. The rod 22 is of such a diameter and material that the amount of twisting is easily taken up in its length, although a suitable joint may be used in connection with it to permit the rod 22 to rotate without twisting, if desired. The forward end of the radius rod 26 is preferably connected to the bracket 27 on the sub-frame 28 by a suitable joint such as 66 (Figures 5 and 6) to accommodate the tendency of the rod 26 to turn when the brake is applied.

The advantages of employing the hydraulic cylinders and operating mechanisms, instead of mechanical connections and mechanically operated front wheel brakes, is that by the use of the construction as shown, it is possible to obtain absolute equalization of pressure to all the brakes without the use of numerous rods, joints, etc., and without the loss through friction due to the use of such joints, resulting in a more efficient mechanism and one that is far less complicated as well as improving the appearance of the vehicle chassis itself.

Although a preferred method of operating the piston 45 by the brake shoes 16 and 17, through the medium of the plunger 33 and bell-crank 41, is shown and described, it is evident that the invention is not limited to this particular construction, but may be varied to suit such conditions that may arise, or even the fancy, and such a variation is shown in Figure 13 in which a cylinder 69, corresponding in detail to the cylinder 43, is positioned vertically beneath the right hand projections of the brake shoes 16 and 17, the piston rod 70 in this case extending upwardly and being directly connected by its transverse slotted end to the pin 18 hingedly connecting the ends of the brake shoes 16 and 17, so that a movement of the piston 71 is obtained in this case, upon rotation of the shoes 16 and 17, in the same manner and with the same results as the piston 45 in the construction first described.

A further variation or modification is shown in Figure 14, in which the rear wheels 1 are provided with brakes similar to the brakes on the front wheels previously described, such rear wheel brakes being applied by extending branches 72 of the tubes 51 back to such rear wheel brakes. Such a construction may be found desirable where the transmission brake has a tendency to chatter, or where a greater braking effect on the rear wheels is desired. In such a case the transmission brake may be cut down in size so as to not cause a material braking effect on the vehicle itself, but to merely act as a servo mechanism to apply the brakes on the wheels.

Formal changes may be made in the specific embodiment of the invention described, without departing from the spirit and substance of the broad invention, the scope of which is commensurate with the appended claims.

What I claim is:—

1. In a motor vehicle, braking means for one set of wheels, hydraulically operable braking means on another set of wheels, pumping means actuated by said first-mentioned braking means, connections between said pumping means and said hydraulic braking means, and means whereby when said first-mentioned braking means is actuated said pumping means is actuated thereby to cause actuation of said hydraulic braking means.

2. In a motor vehicle, mechanical braking means for one set of wheels, hydraulically operable braking means for another set of wheels, pumping means connected to said mechanical braking means capable of being actuated by and upon actuation of said mechanical braking means, manually controlled mechanism for actuating said mechanical braking means, and means connecting said pumping means and said hydraulic braking means whereby when said mechanical braking means is actuated said pumping means is operated thereby to cause actuation of said hydraulic braking means.

3. In a motor vehicle, the combination of mechanically actuated braking means for certain of the wheels of the vehicle, mechanism for manually applying said braking means, hydraulically actuated braking means for other of said wheels, pumping means associated with and operable by and upon application of said mechanically actuated braking means, and means communicating said pumping means with said hydraulically actuated braking means whereby said hydraulically actuated braking means is automatically applied upon application of said mechanically actuated braking means.

4. In a motor vehicle, the combination of mechanical braking means for certain of the wheels of the vehicle, mechanism for manually applying said braking means, hydraulically actuated braking means for other of said wheels, and pumping means operated by said first-mentioned braking means and by the movement of the vehicle for applying said hydraulically actuated braking means.

5. In a motor vehicle, the combination of propelling mechanism for said vehicle, mechanically operated braking means on said propelling mechanism, means under the control of the operator for operating said mechanically operated braking means, fluid pressure operated braking means on certain wheels of said vehicle, and means controlled by said mechanically operated braking means and automatically operated by said propelling mechanism when the mechanically operated braking means is applied to apply said fluid pressure operating braking means with lesser braking effect than the braking effect of said mechanically operated braking means.

6. In a motor vehicle, the combination of mechanical braking means for certain of the wheels of said vehicle, mechanism controlled by the operator for applying said mechanical braking means, fluid pressure actuated braking means for other of said wheels, and fluid pumping means operatively associated with said mechanical braking means and communicating with said fluid pressure actuated braking means whereby the braking action of said mechanical braking means utilizes the movement of the vehicle to actuate said pumping means and to automatically apply said fluid pressure actuated braking means.

7. In a motor vehicle, the combination of mechanical braking means for one set of wheels, fluid pressure operated braking means for another set of wheels, means controllable by the operator for applying said mechanical braking means, means whereby said application causes a partial rotation of said mechanical braking means, and pumping means communicating with said fluid pressure operated braking means operated by said partial rotation to cause application of said fluid pressure operated braking means.

8. In a motor vehicle, the combination of means operable by the operator for applying a braking action to a road wheel, said means including a frictional device adapted to be displaced from its normal position by the resistance offered to such braking action, a fluid containing device operably connected to said friction device whereby said displacement of said frictional device displaces said fluid in said fluid containing device, fluid actuated braking means on another road wheel, and means communicating said fluid actuated braking means whereby said fluid actuated braking means is actuated by the said displacement of said fluid.

9. In a motor vehicle, the combination of a brake drum adapted to be rotated in direct relationship to the rotation of the driving wheels, a frictional device movable into engagement with said brake drum and adapted to apply a braking effect thereto, said frictional device being adapted to be moved a limited amount in the direction of rotation of said drum when in the act of applying a braking effect, fluid displacing means connected to said frictional device whereby to be operated by said movement of said frictional device, fluid pressure actuated braking means on other road wheels of said vehicle, and means communicating said fluid pressure actuated braking means with said fluid displacing means whereby a braking effect on said brake drum automatically causes a braking effect on said other road wheels.

10. In a motor vehicle, the combination of a transmission brake comprising a member rotatable in constant ratio with a road wheel and a frictional device controllable by the operator for engaging said member, means permitting said frictional device to be displaced in the direction of rotation of said member when engaging the same an amount directly proportional to the engaging force, and fluid displacing means operated by said displacement and communicating with fluid actuated braking means on other road wheels of said vehicle.

11. In a motor vehicle, the combination of means controllable by the operator for applying a braking effect to a road wheel, said means including a frictional device adapted to be rotated out of its normal position when effecting a braking action due to the resistance to said action by the movement of said vehicle, a fluid containing cylinder, a piston in said cylinder connected to said frictional device and adapted to be moved to displace said fluid when said frictional device is rotated out of its normal position, fluid actuated braking means on the other road wheels, and means connecting said cylinder with said fluid actuated braking means whereby displacement of said fluid operates said fluid actuated braking means.

12. In a motor vehicle, a mechanically operated transmission brake and fluid pressure operated front wheel brakes, said transmission brake including a drum and shoes, means controlled by the operator for causing said shoes to engage said drum, means permitting said shoes to be moved a limited amount in the direction of rotation of said drum when engaging the same due to the resistance offered to such braking action, a fluid containing cylinder, a piston in said cylinder operatively connected to said shoes whereby said rotary movement of said shoes causes axial movement of said piston to displace said fluid, and means connecting said cylinder with said front wheel brakes whereby said displacement of said fluid causes application of said front wheel brakes.

Signed by me at Detroit, Michigan, U. S. A., this 25th day of March, 1925.

GUY P. HENRY.